Oct. 4, 1949.  E. E. MAGEE  2,483,707
MACHINE FOR ASSEMBLING SHEET MATERIAL
Filed April 16, 1947  4 Sheets-Sheet 2

Inventor:
Earl E. Magee
Dike, Calvert + Porter
Attorneys

Oct. 4, 1949.  E. E. MAGEE  2,483,707
MACHINE FOR ASSEMBLING SHEET MATERIAL
Filed April 16, 1947  4 Sheets-Sheet 3

Inventor:
Earl E. Magee
by Dike, Calvert & Porter
Attorneys

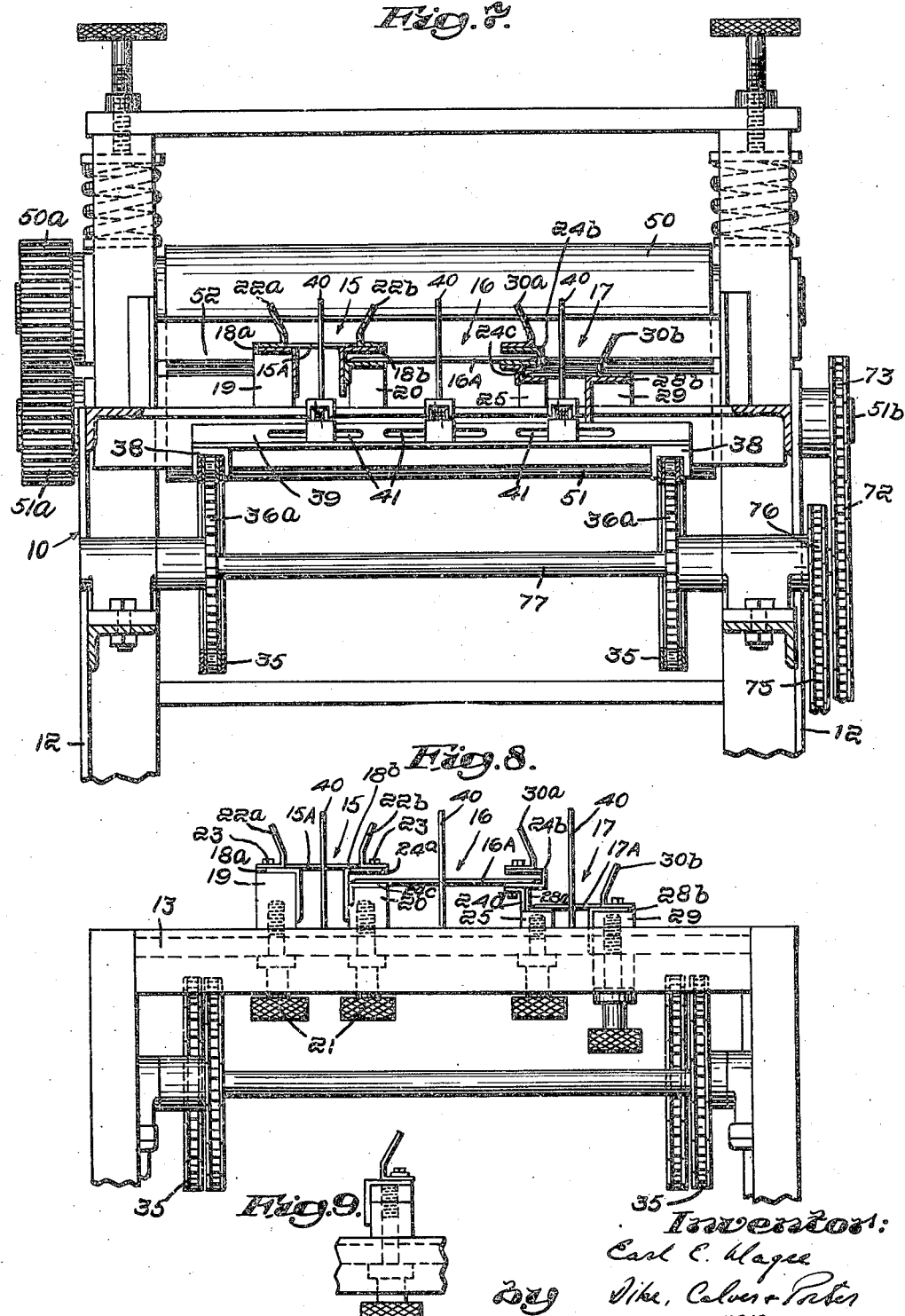

Patented Oct. 4, 1949

2,483,707

UNITED STATES PATENT OFFICE 2,483,707

MACHINE FOR ASSEMBLING SHEET MATERIAL

Earl E. Magee, Middleton, Mass., assignor to Morris Rosenthal and Earl E. Magee, copartners, doing business as Star Die and Supply Company, Lynn, Mass.

Application April 16, 1947, Serial No. 741,926

5 Claims. (Cl. 154—42)

This invention relates to machines for assembling sheet material, and particularly sheets which are adhesively joined to one another, as along their sides.

In the shoe industry, for instance, innersoles are frequently made from assembled sheets or strips of flexible material. A center strip of flexible material, such as pulp board, rubber, cork, or composition material, which will bend with the foot, is first provided, and its side edges are skived and then coated with adhesive. Then side strips of stiffer and tougher material, which will receive and hold nails, are provided, and one side edge is skived and coated with adhesive. At present, the side strips are now joined by hand along their skived and adhesively coated side edges, to the similarly treated sides of the center strip, and the joined edges pressed down by hand-making an assembled sheet, from which the innersoles are then cut. The hand method of assembly is slow, inefficient, and unsatisfactory.

I have accordingly devised a machine for assembling such sheets or strips of material, whereby the sheets, with their edges previously prepared, are fed into the machine, brought into proper registration and alignment with each other, and passed through rollers which press down and cause the strips to adhere at their adjacent edges. By this means the assembling operation is greatly accelerated, the respective strips are more accurately aligned, the joining at the edges is much stronger and more satisfactory, and the cut innersole is a superior product.

Briefly my machine includes a frame, tracks extending longitudinally of the frame to receive the strips of material to be assembled, an endless chain traversing the machine longitudinally thereof beneath the tracks and carrying fingers for picking up and advancing the strips along the tracks in uniform relation, and into the bight of a pair of presser rolls.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Other objects, and advantages of my machine will appear in the following specification and accompanying drawings, in which Fig. 1 is a plan view of my machine;

Fig. 7 is a vertical section on line 7—7 of Fig. 2;

Fig. 8 is a vertical section on line 8—8 of Fig. 2;

Fig. 9 is a detailed view of one of strip guides; and

Fig. 10 is a cross-section of a strip of sheet material.

Figure 1:
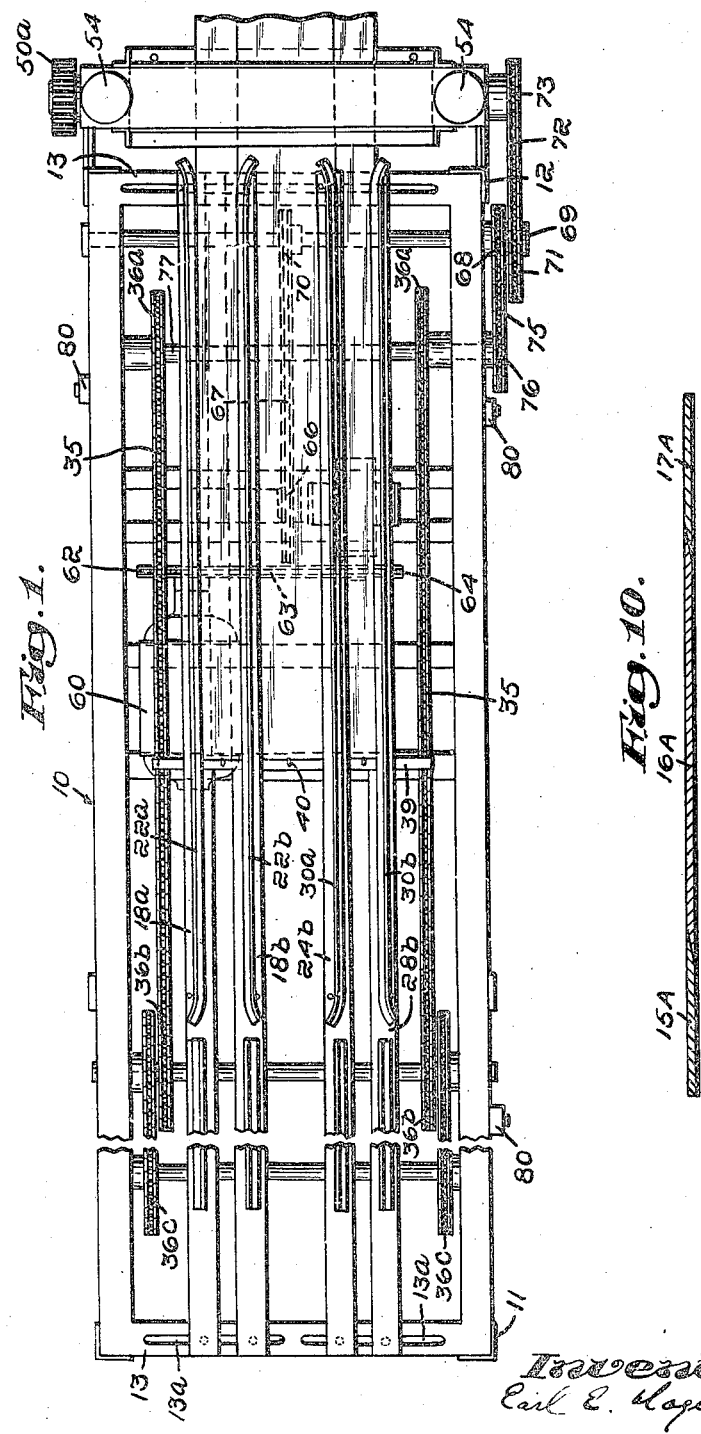

In the drawings 10 represents the frame of the machine, which is generally rectangular in its outer dimensions, having legs 11, sides 12, and cross-members 13. Extending longitudinally of the frame and mounted on cross-members 13 is a set of three pairs of tracks or guides 15, 16 and 17 (left to right in Figs. 7 and 8) to receive the left, center, and right strips 15A, 16A and 17A, respectively, which are to be attached together along their adjacent sides. Slots 13a are provided in cross-members 13 to permit sidewise adjustment and positioning of the tracks 15, 16 and 17 (Fig. 1).

As shown more fully in Fig. 8, track 15 is formed by two angle irons 18a and b, (spaced apart to permit the travelling finger to pass between them), mounted on rails 19 and 20 respectively in any suitable manner, as by bolts or welding, and each rail in turn is mounted on cross-members 13 by means of bolts 21 which pass through the slots 13a provided in said cross-members 13. Guide flanges 22a and b forming side walls for track 15 and to guide the strips 15A therein are mounted on angle irons 18a and b respectively, as by bolts 23.

Center track 16 is formed by what is in effect a pair of U-shaped angle irons 24a and b laid on their side with their open ends facing inwardly, and which are mounted on rails 29 and 25 respectively. Angle iron 24a is formed on its bottom side by angle iron 24c and on its side and top by the vertical and top walls of angle iron 18b of track 15. Angle iron 24b is mounted on iron 24c, in turn mounted on rail 25. It will be noted that track 16 is in a lower plane than track 15 and both tracks are arranged so that their adjacent sides overlap in a vertical plane, to permit strip 15A to overlap center strip 16A for attachment thereto.

Track 17 in turn is formed by angle irons 28a and b, and which are mounted on rails 25 and 29, respectively. Angle iron 28a is formed by the right side wall and bottom plate of angle iron 24c of track 16. Guide flanges 30a and b are also provided for track 17, flange 30a being mounted on angle iron 24b of track 16, and flange 30b being mounted on iron 28b. Track 17 again is provided on a lower plane than track 16, and both tracks are again arranged so that their sides overlap in a vertical plane, to permit center strip 16A to overlap right strip 17A for attachment thereto. The plane positions and widths of the respective tracks 15, 16 and 17 are of course adjustable and variable, depending upon how the strips are desired to be attached to one another, and the width of the strips, and the like.

Figure 5:
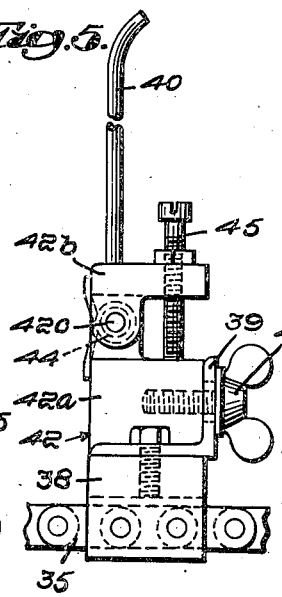
Fig. 5 is a side elevation of the finger mechanism.
Figure 6:
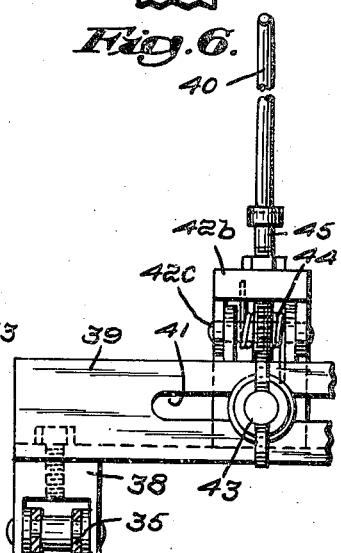
Fig. 6 is an end elevation of the finger mechanism from the right of Fig. 5.

Mounted on the frame 10 and beneath the tracks 15, 16 and 17, a pair of endless chains 35 are provided, running on sprockets 36a, b, and c, to which are attached at spaced intervals, and as to be carried by said chains 35, a plurality of horizontal registration bars 38 extending across the machine. Each bar 38 carries three vertical fingers 40, one of which travels along each track 15, 16 or 17, between the side walls thereof, and their function is to advance the respective strips of material 15A, 16A and 17A along the respective tracks 15, 16 and 17, evenly and abreast of each other and in parallel relation, so that they will be in registration along their front edges when passing through the rollers. As will be seen more particularly in Figs. 5, 6 and 7, bars 38 are mounted on chains 35 and carry a vertical flange 39, which is slotted as at 41, to which the bases 42 of fingers 40 are adjustably mounted laterally as by means of bolts 43. Bases 42 are divided into lower and upper sections 42a and 42b and are pivotally mounted with respect to each other on pivot 42c, and are tensioned forwardly by means of coil spring 44 on said pivot 42c, the forward movement being stopped by vertical screw 45. Thus fingers 40 are yieldingly supported for backward movement, if obstructions to the free forward movement of the strips are met.

Figure 2:
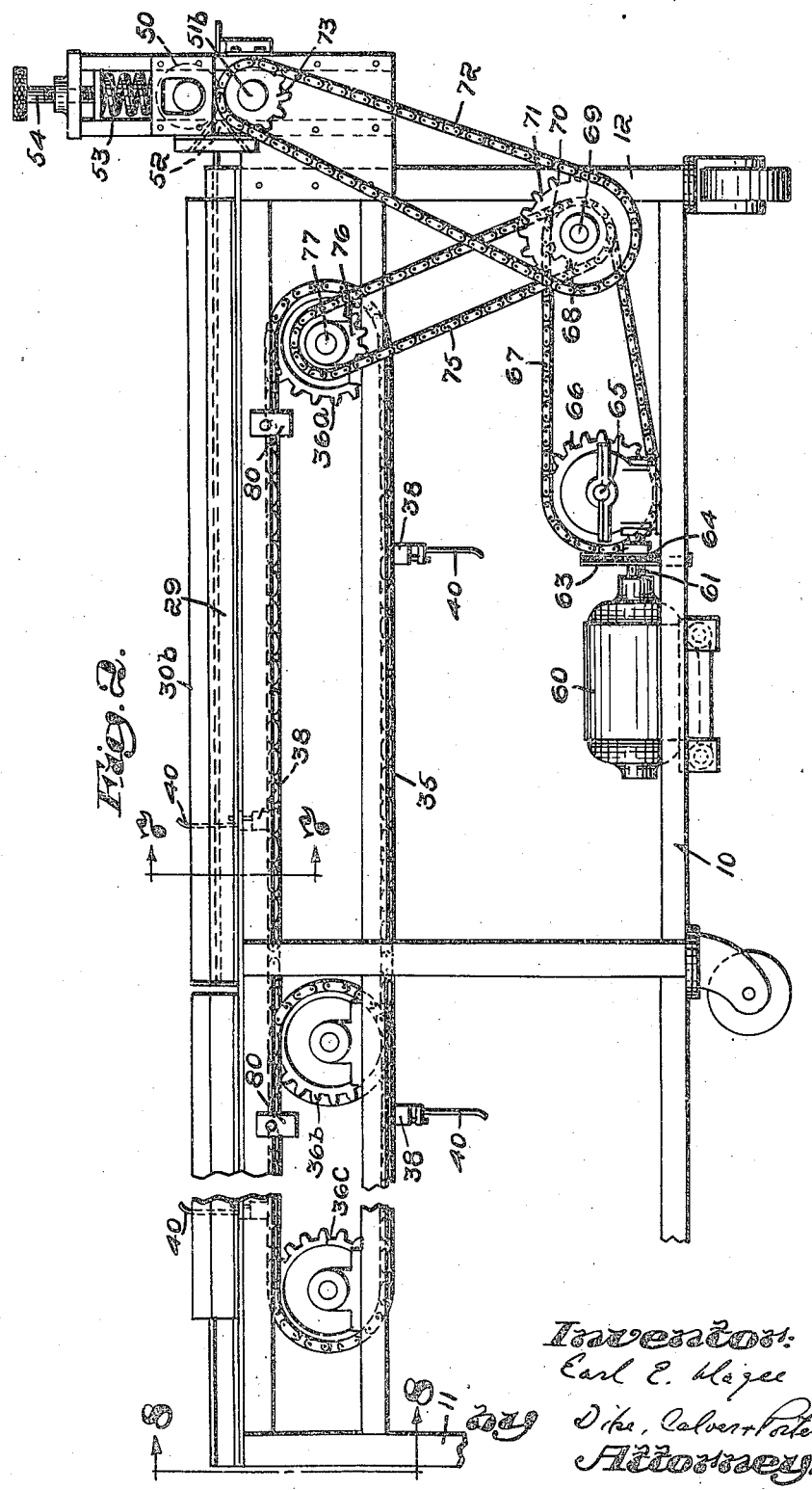
Fig. 2 is a side elevation of the right end of the machine as shown in Fig. 1.
Figure 3:
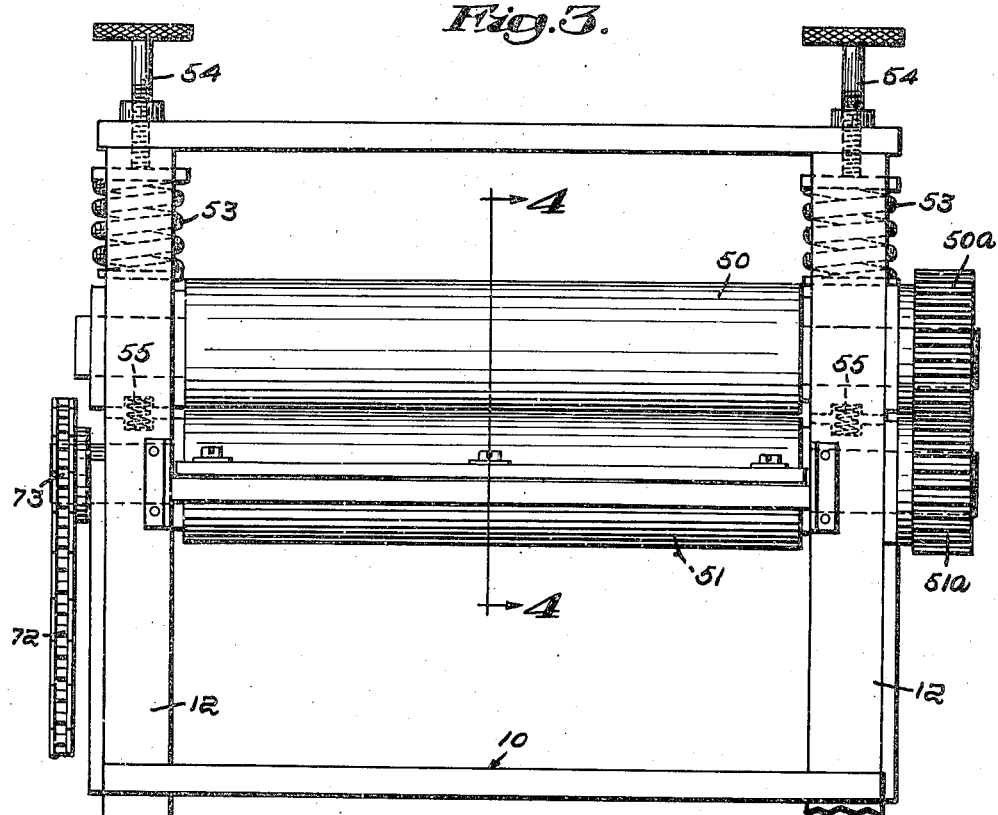
Fig. 3 is an end elevation at the right of Figs. 1 and 2.
Figure 4:
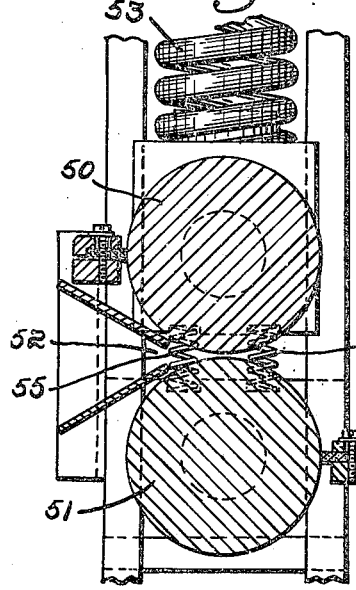
Fig. 4 is a vertical section on line 4—4 of Fig. 3.

At the back end of the machine a pair of presser rollers 50 and 51 are mounted, to which the strips 15A, 16A and 17A are carried by fingers 40, being guided to the bight thereof by funnel guide 52 (Figs. 2, 3 and 4). The pressure exerted by the rollers 50 and 51 is adjusted by means of the coil springs 53 controlled by screws 54 and smaller springs 55 between the rolls (Figs. 3 and 4). Upper roll 50 receives its drive from lower roll 51 through gears 50a and 51a (Fig. 3).

Power for driving the machine is obtained from electric motor 60, from the shaft 61 of which the power is transmitted to sprocket gear 62, thence by chain drive 63 to gear 64, thence by suitable reduction gearing to shaft 65, to sprocket wheel 66, through chain 67 to sprocket 68 and shaft 69, which at one end carries the two sprocket wheels 70 and 71. Wheel 70 through chain 72 then drives sprocket wheel 73, mounted on shaft 51b of lower presser roll 51, and upper roll 50 receives its drive from lower roll 51 through end gears 50a and 51a (Fig. 3). At the same time wheel 71, through chain 75 drives sprocket wheel 76 mounted on shaft 77, which in turn at the opposite ends thereof carries a pair of sprockets 36a which drive chains 35, and supporting sprockets 36b and c, thus furnishing the drive for bars 38 carrying fingers 40. Suitable switches 80 are attached to the machine connected to the electric motor 60 for starting and stopping the machine.

The operation of the machine is as follows: The strips of material 15A, 16A and 17A, whose adjacent edges have been skived and precoated with adhesive, are placed in their respective tracks 15, 16, and 17, by the operators, or from a mechanical feeding device, and in the manner in which they are to be joined in final form in the assembled strip. The strips are then picked up by the fingers 40, and carried by them along the machine and in their respective tracks, where they are delivered simultaneously and abreast of each other, and with adjacent sides overlapping, into the funnel guide 52, and thence between rolls 50 and 51, where the strips are pressed together along their adhesively-coated edges, to form one composite strip, as shown in Fig. 10. It will be understood, of course, that more or less than three strips can be assembled and joined in this manner, in varying widths, and in different arrangements of overlying strips, by re-arrangement of the tracks, their planes, and widths. A second set of presser rolls may be provided, if desired, to give an additional or varying pressure on the strips.

I claim:

1. A machine for assembling sheet material, comprising a frame, tracks extending longitudinally of said frame for receiving and guiding strips of material to be assembled, said strips having adhesively coated adjacent edges, an endless chain mechanism traversing the machine longitudinally thereof beneath said tracks, fingers carried by said chain mechanism for advancing the strips along the tracks, and a pair of presser rolls for receiving said strips from the tracks and pressing them together along the adjacent edges.

2. A machine for assembling sheet material, comprising a frame, a plurality of tracks extending longitudinally of said frame for receiving and guiding strips of material to be assembled in pre-determined relation, said strips being adhesively coated along their adjacent edges en endless chain mechanism traversing the machine longitudinally thereof beneath the tracks, a series of parallel fingers carried by said chain mechanism, for advancing the strips along the tracks in parallel relation to one another, and a pair of presser rolls for receiving said strips and pressing them together along their adjacent adhesively coated edges.

3. A machine for assembling sheet material, comprising a frame, a plurality of tracks extending longitudinally of said frame for receiving and guiding strips of material to be assembled, said strips having adhesively coated edges, and said tracks being arranged in two or more planes and in overlapping relation to permit said strips to be attached to one another along their adjacent edges, an endless chain mechanism traversing the machine longitudinally beneath the tracks, a series of parallel fingers carried by said chain mechanism for advancing the strips along the tracks in parallel relation to one another, and a pair of presser rolls for receiving said strips and pressing them together along their adjacent adhesively coated edges.

4. A machine for assembling sheet material, comprising a frame, a plurality of tracks extending longitudinally of said frame for receiving and guiding strips of material to be assembled, said strips having adhesively coated edges, and said tracks being arranged in two or more planes and in overlapping relation to permit said strips to be attached to one another along their adjacent edges, an endless chain mechanism traversing the machine longitudinally beneath the tracks, a series of parallel fingers carried by said chain mechanism for advancing the strips along the tracks in parallel relation to one another, and a pair of presser rolls for receiving said strips and pressing them together along their adjacent adhesively coated edges, and a guide for guiding said strips into the bite of said presser rolls.

5. A machine for assembling sheet material, comprising a frame, a plurality of tracks extending longitudinally of said frame for receiving and guiding strips of material to be assembled, said strips having adhesively coated edges, and said tracks being arranged in two or more planes and in overlapping relation to permit said strips to be attached to one another along their adjacent edges, an endless chain mechanism traversing the machine longitudinally beneath the tracks, a series of yieldingly parallel fingers carried by said chain mechanism for advancing the strips along the tracks in parallel relation to one another, and a pair of presser rolls for receiving said strips and pressing them together along their adjacent adhesively coated edges.

EARL E. MAGEE.

REFERENCES CITED

The following references are of record in the file of this patent:

UNITED STATES PATENTS

| Number | Name | Date |
| --- | --- | --- |
| 1,841,539 | Kleinschmit | Jan. 19, 1932 |
| 1,912,527 | Kleinschmit | June 6, 1933 |
| 1,916,134 | Dike | June 27, 1933 |
| 2,024,932 | Kushera | Dec. 17, 1935 |
| 2,217,306 | Burrill | Oct. 8, 1940 |